J. JESSEN.
INTERNAL COMBUSTION MOTOR.
APPLICATION FILED MAR. 10, 1914.

1,294,274.

Patented Feb. 11, 1919.
9 SHEETS—SHEET 1.

WITNESSES
J. A. Sharma
A. E. Sorensen

INVENTOR
JAMES JESSEN.
BY
Powell & Powell
ATTY'S

UNITED STATES PATENT OFFICE.

JAMES JESSEN, OF MINNEAPOLIS, MINNESOTA.

INTERNAL-COMBUSTION MOTOR.

1,294,274.   Specification of Letters Patent.   Patented Feb. 11, 1919.

Application filed March 10, 1914. Serial No. 823,679.

*To all whom it may concern:*

Be it known that I, JAMES JESSEN, citizen of the United States, resident of Minneapolis, Hennepin county, Minnesota, have invented certain new and useful Improvements in Internal-Combustion Motors, of which the following is a specification.

My invention relates to an internal combustion motor of the low compression explosive type, and the object I have in view is to produce a motor of this type in which complete combustion of the low grade and heavy fuel oils, as well as the lighter oils, will be fully attained under all operating conditions under variable load and variable speed.

Further objects are the design of a motor of the type described that will be quickly responsive to control under sudden changes of load while using either low or high grade fuels, that will be simple, light and compact in construction and for these reasons eminently adapted for motor car and tractor service.

To these ends my invention consists generally in a four stage process of gasification of the air and fuel for combustion,— first, initial vaporization, second, oxy-genation and aeration, third, rarefication by heating, and fourth, final gasification and compression.

More specifically my invention consists in an initial fuel vaporizer and an oxygenating, charging pump, working in conjunction with a pressure and vacuum controlling valve, through which the fuel and air in predetermined quantities are repeatedly forced by alternating vacuum and pressure conditions set up in a pump; the subsequent heating of the vapor in an annular retort, directly at the points of admission to the motor cylinder, its injection through a series of nozzles into fusion with a body of air previously introduced into the motor cylinder, and final compression and ignition of the fused charge.

Further the invention consists in various constructions and combinations, all as hereinafter described and particularly pointed out in the claims, taken in connection with the accompanying drawings, in which.

The invention is especially applicable to a motor working on the two stroke cycle, and a motor unit consisting of two motor cylinders and a double acting pump.

In the drawings, 2 represents the main crank case having crank shaft bearings 3, 4 and 5. The crank shaft 6 has two crank pins 7 and 8 set 180 degrees apart relative to the center of rotation of the shaft 6. Motor cylinders 9 and 10, in which work the pistons 11 and 12, are arranged above the crank pins 7 and 8 and connecting rods 13 link the crank pins and pistons together by means of the wrist pins 14. The upper section of the cylinders 9 and 10 consist of separate heads 15 forming ground joints with the lower sections at 16 and are secured to the lower sections by studs or bolts 17. The two lower sections 9 and 10 are preferably cast integral with the horizontally arranged pump cylinder 18 and are, together with the heads 15, substantially identical in construction. Hence the description of one cylinder will apply equally to both, as hereinafter will appear.

Figure 2:
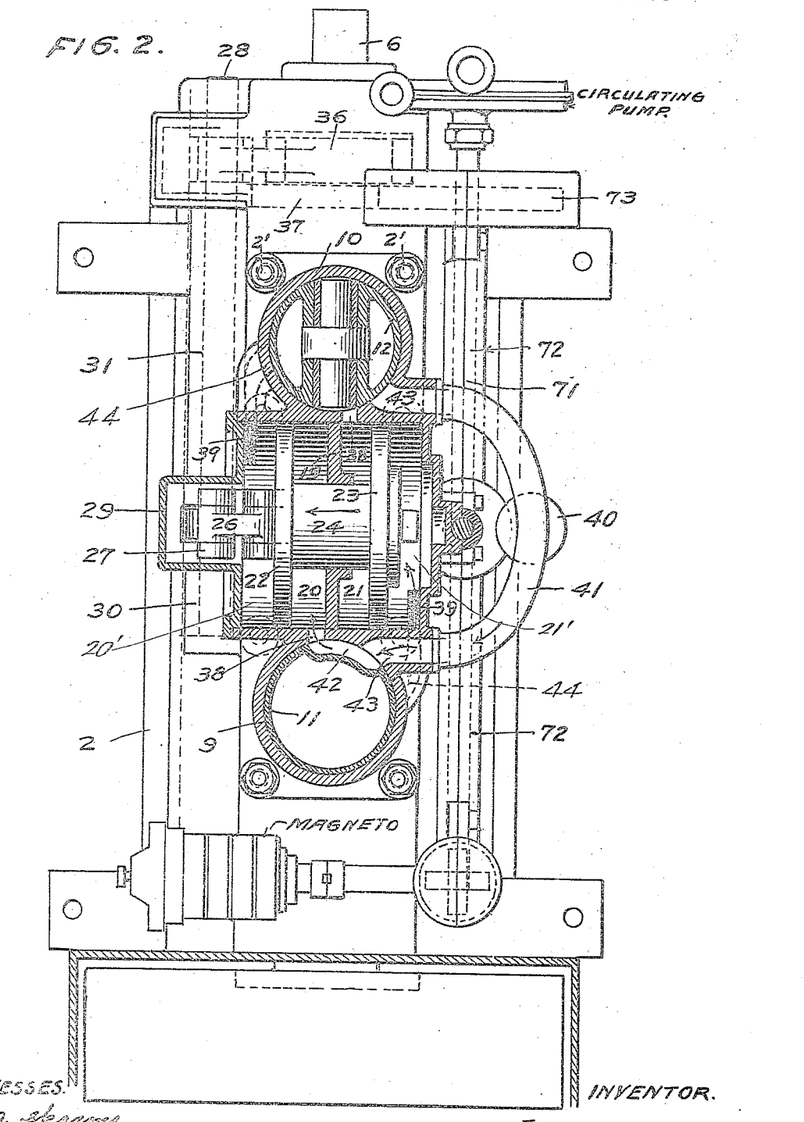
Fig. 2 is a horizontal section taken on the line *a—a* of Fig. 1.
Figure 3:
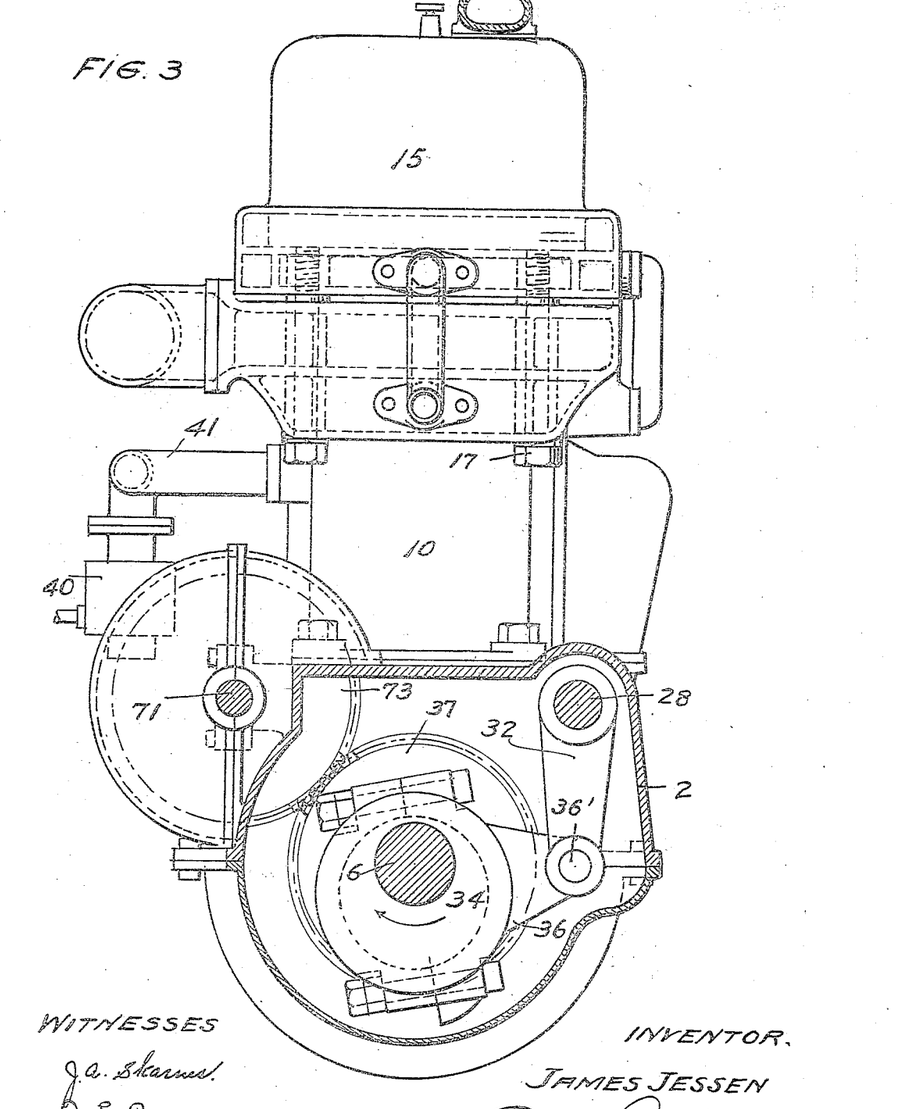
Fig. 3 is a vertical transverse section on a larger scale, taken on the line *y—y* of Fig. 1.
Figure 4:
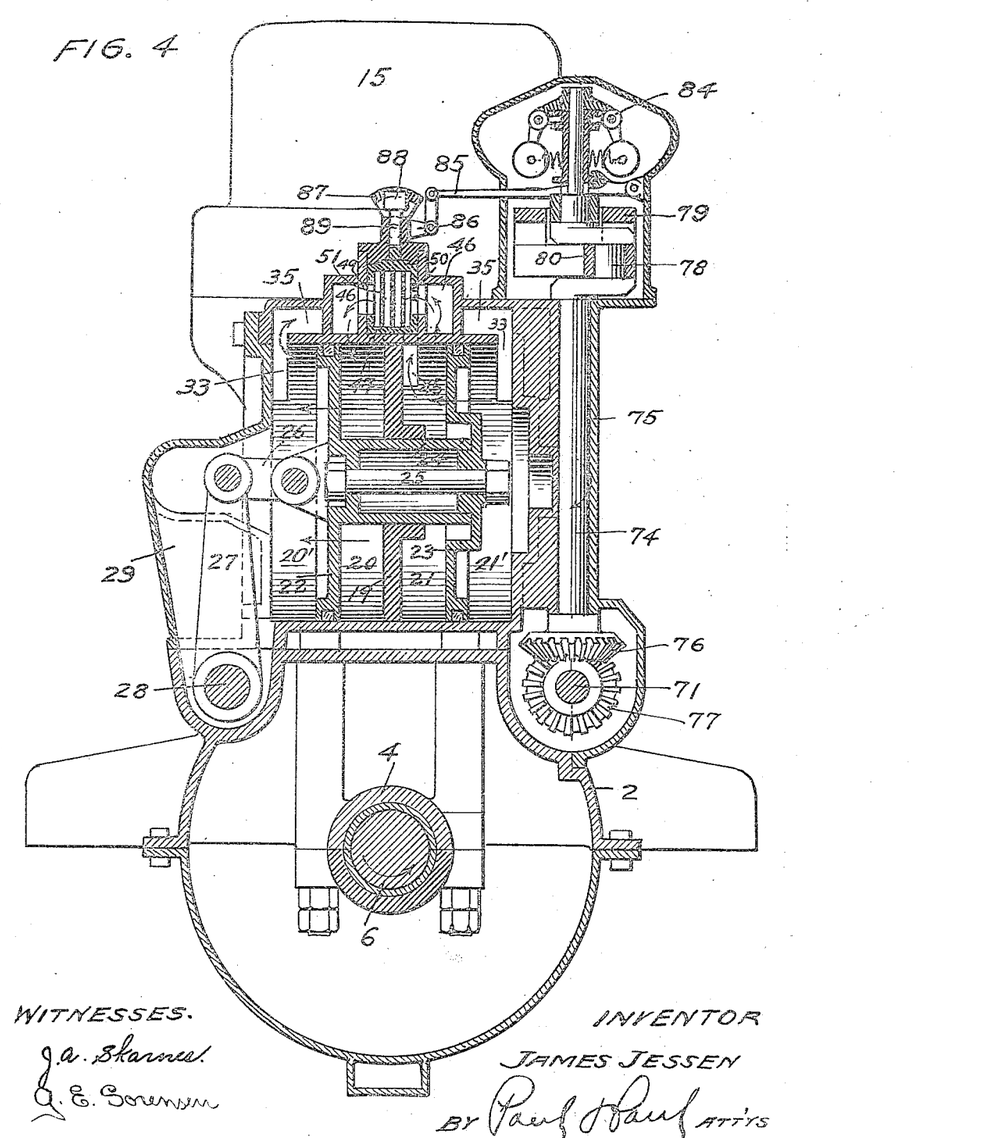
Fig. 4 is a similar section, taken on the line *x—x* of Fig. 1.

As the pump is the primary acting element of the motor, a description of it will precede that of the motor cylinders. A reference to Figs. 1, 2, 3, 4 and 5 will show the construction and operation of this pump. In Figs. 2 and 4 the cylinder 18 is shown to be provided with a central partition 19, dividing the cylinder into two separate compartments 20 and 21. Double acting pistons 22 and 23 are adapted to reciprocate in the compartments 20 and 21 respectively, and are shown to be connected together by a tube 24 and bolt 25. The pistons 22 and 23 are driven by means of a link 26, that is connected to a rocker arm 27 on a rocker shaft 28 and working in the air tight extension 29 of the cylinder compartment 20. The rocker shaft 28 is mounted in bearings 30 and 31 in the crank case and extends preferably to the forward end of the crank case 2, where it is integrally connected to a depending arm 32 (see Fig. 3). An eccentric 34, that is arranged upon the crank shaft 6, operates the rocker shaft 28 through the strap 36, arm 32 and pin 36'. I prefer to divide the crank bearing 5 and interpose the eccentric 34 and a gear 37 in its middle portion in order to avoid overhang bearings.

To secure compactness and symmetry of design the pump cylinder and pistons are of considerably larger diameter than stroke, and the pistons are short and of light weight. The eccentric 34 is adjusted to the crank shaft 6 so that when the motor pistons 11 and 12 are at the end of their stroke, the pump pistons are substantially in the center of their stroke, as shown in Figs. 2 and 4. Gas intake ports 38 and air intake ports 39 are provided for the compartments. The gas intake ports 38 have communications with a small vaporizer or fuel feeder 40 through a curved pipe or manifold 41, made of small diameter to induce a high velocity of the passing air currents. The communication of the gas intake ports 38 with the fuel feeder 40 is controlled and affected by the motor pistons 11 and 12 by means of a by-pass 42 arranged in the pistons and adapted to register with the gas intake ports 38 and a port 43, both arranged in the motor cylinders, and the port 43 being connected to the manifold 41. The air intake is preferably controlled in a similar manner by the motor pistons 11 and 12 by means of the air intake ports 39 being connected to the lower section of the motor cylinder 9 and 10 through ports 44 as shown by dotted lines in Figs. 1 and 2. Air outlet ports 33 lead to ducts 35 and gas outlet ports 45, (Figs. 1 and 5) are provided for each compartment 20 and 21 and opens into channels or ducts 46. The ducts 46 have communications with each other through the governing valve 47, which is mounted in a housing 48. Ports 49 in this housing are adapted to register more or less completely with similar ports 50 in the valve 47 when the valve is rotated, and the interior of the valve is provided with a series of screens, or other air resisting, porous material 51 adapted to separate the molecules of fuel oil in its passages.

Figure 5:
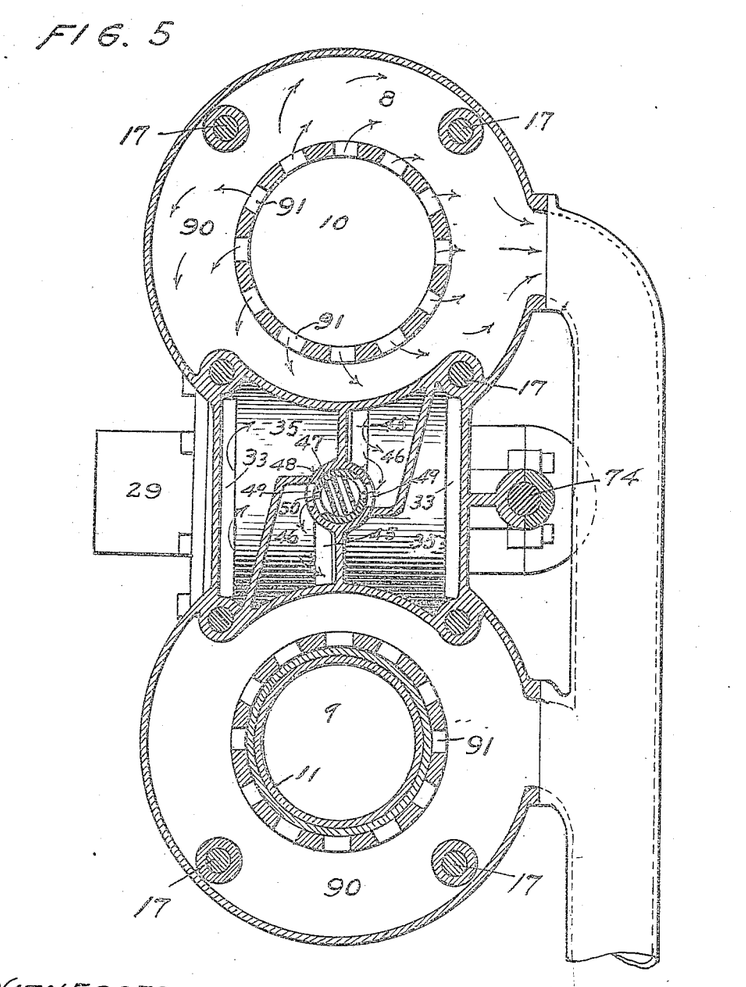
Fig. 5 is a horizontal sectional view on the line *b—b* of Fig. 1.
Figure 6:
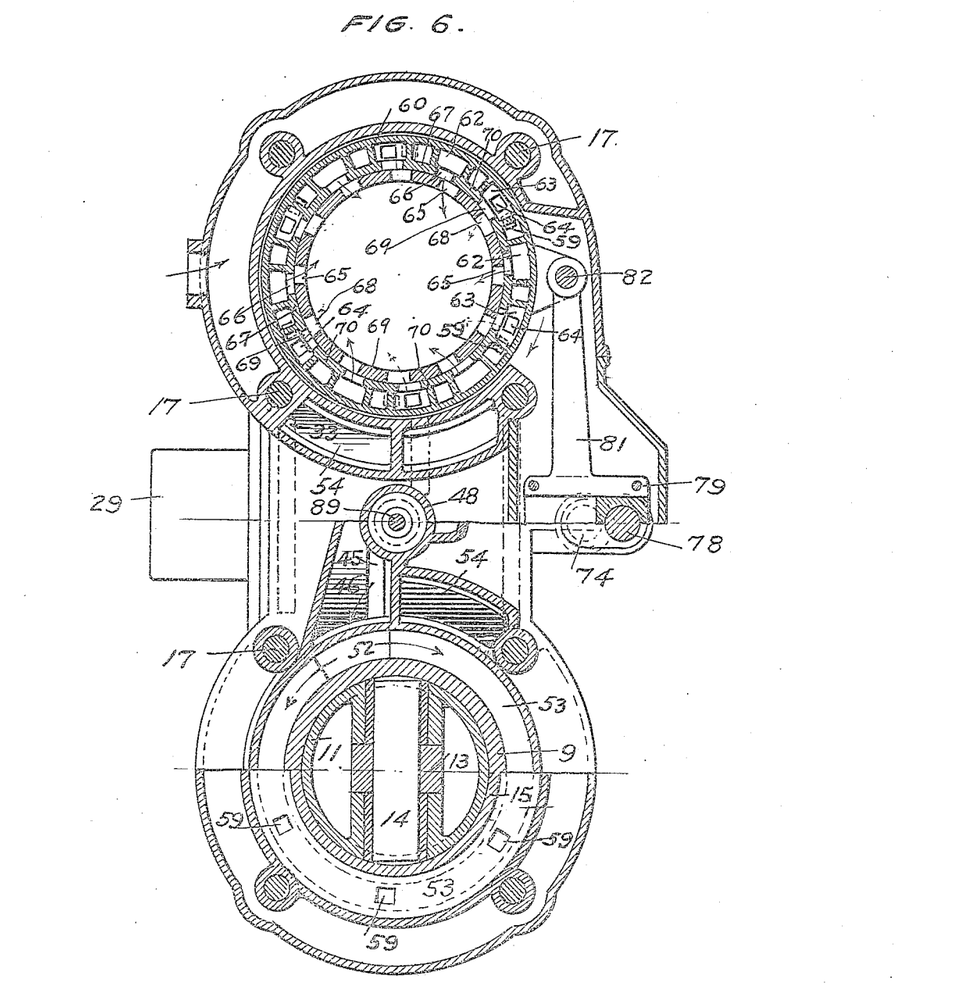
Fig. 6 is a similar section on the line *c—c* of Fig. 1.
Figure 7:
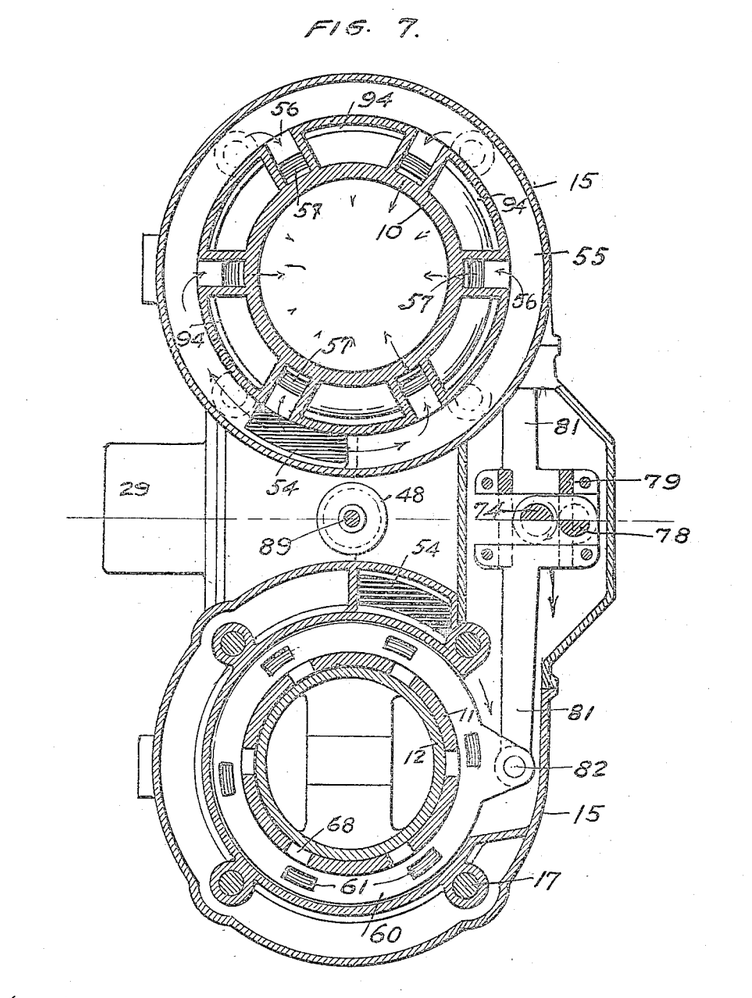
Fig. 7 is a similar section on the line *d—d* of Fig. 1.
Figure 9:
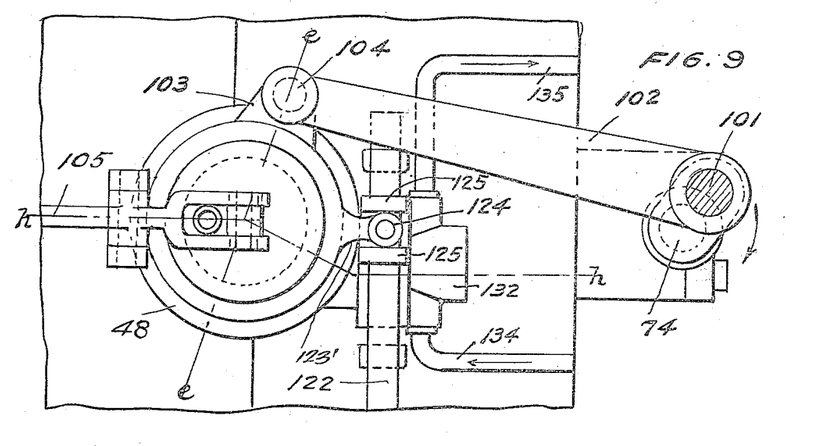
Fig. 9 shows a plan view of a modified construction of the controlling valve.
Figure 10:
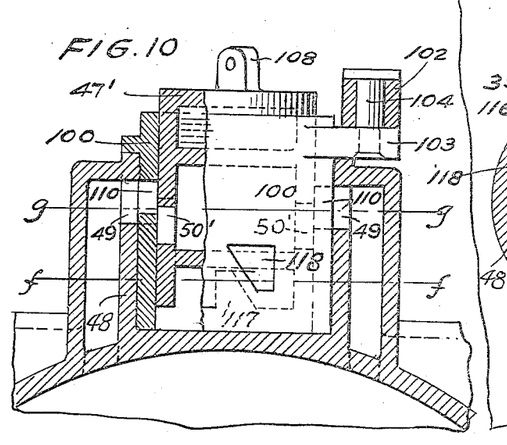
Fig. 10 is a vertical section on the line *e—e* of Fig. 9.
Figure 11:
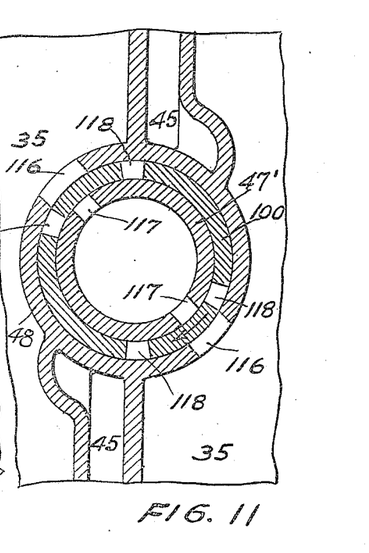
Fig. 11 is a horizontal transverse section on the line *f—f* of Fig. 10.
Figures 12, 13, 14, 15, 16:
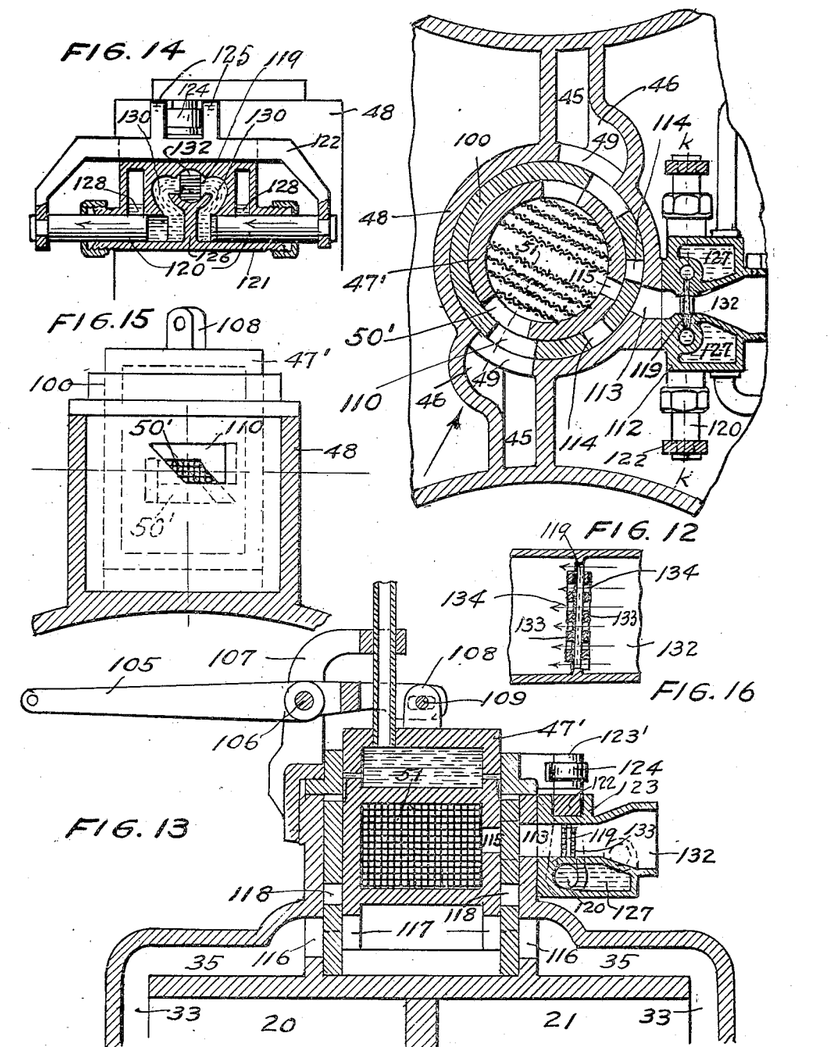
Fig. 12 is a similar section on the line *g—g* of Fig. 10.
Fig. 13 is a vertical section on the line *h—h* of Fig. 9.
Fig. 14 is a section on the line *k—k* of Fig. 12.
Fig. 15 is a detail of the valve with the casing broken away and looking in the direction of the arrow in Fig. 12.
Fig. 16 is a detail of the initial vaporizer.

The fuel mixed with a quantity of air is drawn from the vaporizer 40 in a vaporized condition, into the cylinders 20 and 21. If the valve ports 50 are sufficiently open, all or nearly all the vapor passing through the valve is repeatedly reversed in direction by each stroke of the pistons and forced back and forth through the valve 47 and screens 51. If, however, the valve 47 is partially closed the resultant pressure in the cylinder compartments 20 and 21 forces a part of the gas through the gas ducts 46 and ports 52 (Figs. 1 and 6) into annular heating and distributing channels 53 arranged around the motor cylinders 9 and 10, above the exhaust chamber 90. The amount of gas passing into this channel is dependent on and varies with the opening and closing of the valve 47. Referring to Figs. 5, 6 and 7, it will be seen that the air ducts 35 connect with ports 54 leading upward to annular air distributing channels 55 in the motor cylinder heads 15. A series of radial ducts 56 lead inwardly from the channel 55 to openings 57 communicating with an annular valve chamber, and a series of smaller openings 59 lead from the gas distributing channels 53 to the said valve chamber. A ring valve 60, having upper and lower seats, is arranged in the conjunction between the motor cylinders and heads 15, a recess in the heads 15 preferably forming the valve chamber. The upper wall of the recess forms the upper seat for the valve 60 and the upper wall of the channel 53 forms the lower valve seat. The upper openings 57 admit air through the valve ports 61 to the valve chambers 62 and the lower openings 59 admit gas to the valve chambers 63, through the valve ports 64.

A series of ports 65 in the cylinder wall are adapted either to register with the radial or tangent valve ports 66 leading from the air valve chambers 62, or be intermittently closed by the valve bridges 67 and a series of ports 68 in the cylinder wall will register with a multiple of radial or tangent valve ports 69 leading from the gas valve chamber 63 or be closed by the valve bridges 70, when the valve 60 is operated.

Figures 1, 8:
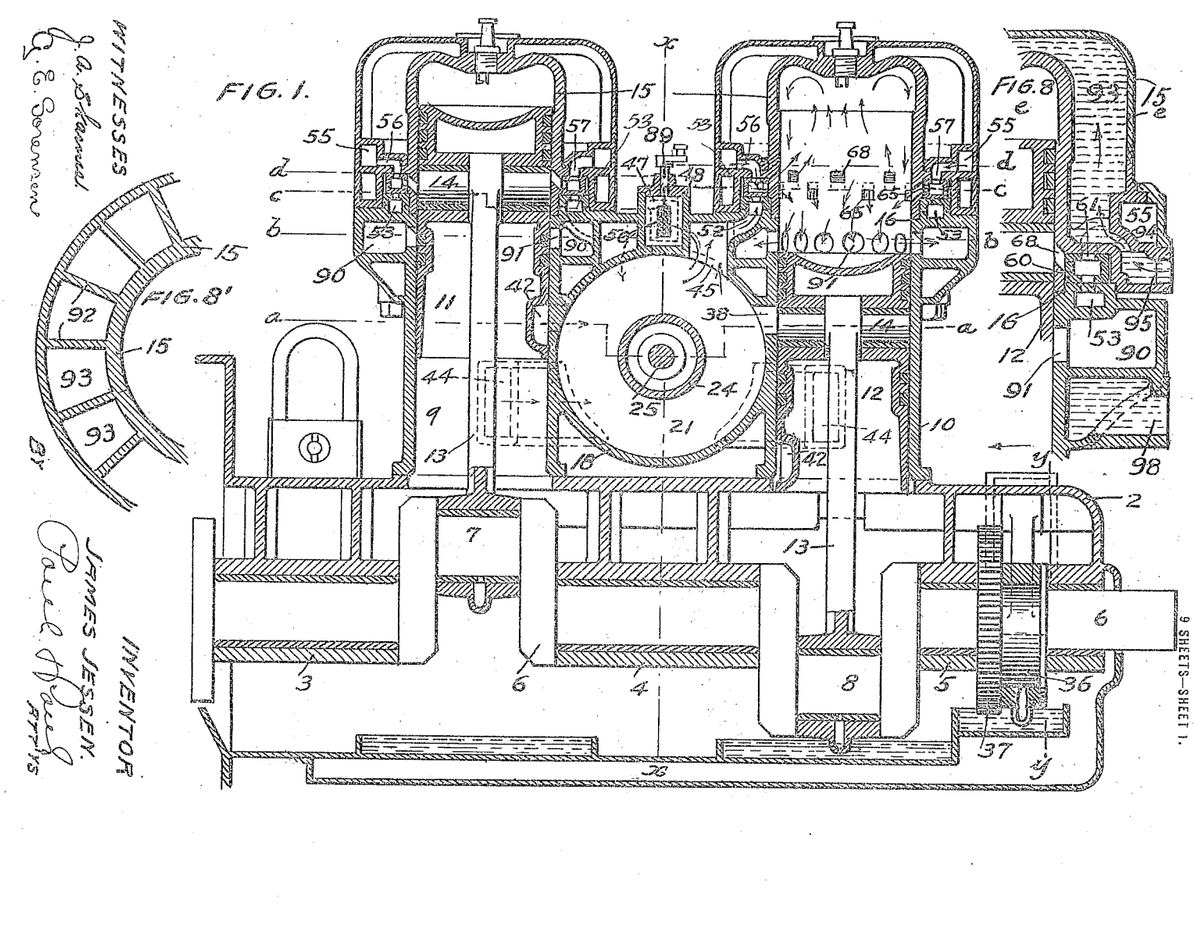
Figure 1 is a vertical longitudinal section of a motor embodying my invention.
Fig. 8 is a vertical section similar to Fig. 1 of a portion of the motor cylinder on a larger scale, taken on a slightly different plane and showing modified construction, Fig. 8' is a detail taken on the line *e—e* of Fig. 8.

The valves 60 may be operated with an oscillating movement, as shown in Figs. 1, 4, 6 and 7. Referring to Figs. 1, 3 and 4, a rotatable shaft 71 is arranged in bearings 72 upon the crank case 2 and is driven from a gear 73 meshing with the gear 37 upon the crank shaft 6. An upright shaft 74 is journaled in bearings 75, midway between the cylinders 9 and 10 and carries at its lower end a bevel gear 76, that is in mesh with a bevel gear 77 and arranged upon the shaft 71. The shaft 74 is driven at the same rate of speed as the crank shaft 6. It is at its upper end provided with a crank pin 78, which engages a slotted yoke 79 by means of a bearing block 80. Rigid horizontal connecting rods 81 project in opposite directions from the yoke 79 and are pivoted to the valves 60 by pins 82. As the shaft 74 is rotated the valves 60 are oscillated around the cylinders 9 and 10 and are timed to be substantially in the middle of their stroke when the pistons 11 and 12 are at the end of their stroke.

The valve controlling mechanism shown in Fig. 4 is best adapted to motors with medium load fluctuation. As shown, an automatic governor 84 is arranged upon the shaft 74 and controls the speed of the motor by partially rotating or oscillating the throttling valve 47. The controlling lever 85, acted upon by the governor is linked to the rocker arm 86, that carries a segmental bevel gear 87 meshing with the bevel gear 88 upon the valve stem 89. When the speed increases the lever 85 will be lowered and the valve 47 rotated to open the valve ports 50, which admits more gas through the valve 47 from the pressure to the suction pump compartment and consequently lowers the pressure on the pressure side, resulting in a smaller amount of fuel gas being forced into the motor cylinder.

When the speed decreases the governor operates to close the valve openings, resulting in an increased pressure in the respective gas compartments and an instantly increased charge of the gas already present at the injection nozzles to the motor cylinders. The capacity or volume displacement of the charging and fuel oxygenating pumps is nearly double that of one of the motor cylinders, the gas volume of the compartments 20 and 21 being somewhat smaller than that of the air compartments 20' and 21'. As the air compartments of the pump supply their full capacity of air to the motor cylinders at each stroke, it is evident that only a small part of the oxygenated fuel pumped by the gas sides of the pump is needed in the motor cylinders. The excess of fuel gas contained in the pumps will therefore be repeatedly forced back and forth through the valve 47 and its screens and only as much as is supplied to the motor cylinders will be drawn in from the carbureter 40. The direct communication from the gas compartment of the pump to the vaporizer is shown, timed to open at the last fraction of the pump stroke. As a result a vacuum is induced in the pump cylinder at every stroke of the pistons, the degree of which depends on the amount of gas admitted from the pressure to the vacuum side of the gas pump.

The subsequent compression actively assists in bringing the different molecules still closer together and the rapid repetition of these vacuum and compression pulsations combined with the heat from the combustion naturally present in the internal passages of the motor positively assures every single fuel molecule being brought within active reach of a certain number of air molecules. As the number of air molecules present in the gas at this stage is not sufficient for perfect combustion, the gas is further rarefied by heat directly before its final blending with the air that has already been forced into the motor cylinder through the valve 47 from the opposite end of the pump during the exhaust period.

As the exhaust ports 91 are closing by the advancing motor piston, the valve ports 90 are opened and the heated and rarefied gas forcibly injected by the pump and distributed through the series of injection nozzles opening to every part of the combustion chamber. The heated and rarefied state of the injected gases causes their complete fusion and commingling with the cylinder air and the effect of this fusing and the subsequent compression is a perfectly homogeneous and highly combustible hydro-carbon gas. It has been found that the expansion or separation by heat of the hydro-carbon molecules not mixed, or imperfectly mixed with air, above a certain fixed temperature, is attended with internal molecular changes, producing decomposition, popularly known as "cracking", which separates the carbon from the hydrogen. When this takes place perfect combustion is impossible and for this reason the mere device of heating the carbureter or air passages in a variable speed and variable load motor is ineffective and impractical, partly because the exact degree of heat cannot be maintained and also because of imperfect blending of air and fuel molecules.

These conditions result in loss of power and carbon deposits in cylinder, but with the means for complete molecular blending of air and hydro-carbon, as heretofore described, the expansion of the resulting gas by heat of varying degree has no deleterious effect, but increases its adaptation to more complete combustion.

In Figs. 9 to 15 a pressure and governing vacuum valve gear is shown, especially adapted for motors where greater flexibility of speed and load is required. The controlling or governing valve 47' is here supplemented by an oscillating cut-off valve 100, arranged between the valve 47' and the valve housing 48. The valve 100 is driven from an eccentric or crank pin 101 upon the shaft 74 by means of a connecting rod 102, valve arm 103 and pin 104, and it is timed to cut off the gas passage 50' through the valve 47' from one pump compartment to the other at the periods of the pump stroke, governed by the vertical position of the valve 47'. This position may be varied by either an automatic governor or hand control mechanism, (not shown) which may be attached to the control lever 105, which is pivoted at 106 to a standard 107 and has a forked slotted inner end which engages the valve lug 108 by means of a pin 109. The valve ports 50' in the governing valve 47' and the ports 110 in the oscillating valve 100 are shaped in the form of trapezium, the angular sides of which open and close the ports to establish or shut off communication between the two gas compartments of the pump at variable periods, these periods being controlled by the vertical position of the governing valve 47'.

To simplify construction, the piston-controlled passages from the pump to the vaporizer 40, the gas intake ports 30, 38, and 43, and the manifold 41 are dispensed with and the vaporizer put in direct communication by means of an intake opening 113 in the valve housing 48. Valve ports 114 in the oscillating valve 100 and a port 115 in the governing valve 47', of the same general form as the valve ports 50' and 110, control the admission of vapor from the vaporizer to the pump in variable quantities. To reduce the rate of compression in the motor cylinders at very light loads or slow speed, communication is also established between both the air pumping ends of the pump by means of port holes 116, (see Figs. 10 and 11) in the housing 48 and the valve ports 117, and 118 arranged in the valves 47' and 100 respectively.

The valve air ports 117 and 118 are of the same general form as the vapor and gas ports and are controlled in like manner by the vertical position of the governing valve 47'. After the exhaust ports are closed by the piston in the motor cylinder, the air is permitted for a variable period of time to return through the ring valve 60 to the acting pressure air pump compartment and through the valve ports 117 and 118, port hole 116 and air ducts 35 to the suction end of the pump. In operation with this valve gear, when the vapor valve ports 114 and 115 open at the latter part of the pump stroke, and a partial vacuum has been induced in the suction gas compartment, air, rushing through the restricted passage of the vaporizer, draws a portion of fuel from the nozzle 119 in the form of a vapor and entering the valve chamber, is forced through the pulverizing screens 51 and valve ports into the vacuum pump chamber.

When the pump piston returns, as much of the vapor is again forced through the screens and into the vacuum in the opposite gas pump as the vertical position of the governing valve will admit. The remainder is compressed and a part of it injected into the motor cylinder. The air, vapor and gas admission ports in the governing valves 47' and 100 are adjusted and timed so that the port openings are operating in the proper relation and degree to each other for the governing or control of the motor. Several modifications of constructions, valve timing and operation will readily suggest themselves in connection with this construction. One such important modification for the reduction of compression in the motor cylinder would be to dispense with the air relief openings in the valves 47' and 100, modify the timing of the motor cylinder admission valve 60 slightly and adjust the ports in the governing valves 47' and 100 to induce a vacuum in the gas pump compartments at the beginning instead of at the end of the pump stroke. Into this vacuum a measured amount of vapor from the vaporizer would be admitted and then, by timing the opening of the valve passage for direct connection between the two gas pump compartments, a return flow of the charge in the motor cylinder to the gas pump compartments would result in such flow being induced by the compression of the charge in the motor cylinder and the induced vacuum in the pump cylinder.

With this control the full charge of oxygenated gas would first be injected into the motor cylinder and combined with air, and a variable quantity of this gas would be again discharged from the cylinder, returned to the vacuum compartment in the pump, and subsequently injected into the other motor cylinder.

For highly volatile fuels, any ordinary vaporizer, as indicated in Figs. 2 and 3, may be sufficient, but for the heavier grades of fuel oil and crude oil the variable, automatically-controlled spraying vaporizer shown in Figs. 9, 12, 13, 14, and 16 is needed for the initial breaking up and feeding of the fuel. This vaporizer consists of double acting pump pistons 120, operating in pump barrels or cylinders 121 and connected by means of a yoke 122. This yoke slides between guides 123 and is preferably driven by an arm 123' projecting from the sleeve valve 100. A roller 124 is provided in the arm 123' and is adapted to operate between two lugs 125 on the yoke 122. The pump cylinders 121 are separated by a partition 126 and are connected to a fuel supply chamber 127 by ports 128, that automatically open to the pump cylinder at the outward end of each stroke. Oil ducts 130 lead from the inner ends of the cylinders upward to the spraying nozzles 119. These nozzles are arranged upon opposite sides of the air induction passage or duct 132 and are formed as narrow slots through which the fuel is sprayed between slotted plates 133, in a thin stream of liquid fuel across the air duct 132. The air rushes through the slots 134 of the plates 133 and picks up the oil in its path, while oil passing between the open slots is forced across and is taken up by the other pump plunger.

In operation, the strokes of the pistons are timed to occur simultaneously with the induction of the vacuum in the oxygenating pump cylinders. It is evident that with this vaporizer the amount of fuel spray absorbed by the air currents in their passage through the liquid fuel stream is dependent on the relative force of the cross streams of air and fuels. As the force of both streams increases in direct ratio with the speed of the motor, it follows that the relative amount of fuel carried off by the air currents is practically unaffected by variable speed, but can be determined for all speeds and loads by the bore or stroke of the pump and need not be further adjusted. As the force of the air current is diminished at slower speed, so also is the force of the cross going oil stream, and the same proportion of fuel and air is maintained. Under a heavier load, with the same speed, the increased force of the air current absorbs more oil between the slotted plates and less is carried across between the slots. The danger of partly or wholly clogging the very restricted fuel passages of the ordinary vaporizer or carbureter is entirely removed with this system, as all passages are of ample size and no valves or springs are used. While I have shown the oil pump closely connected to the vaporizer and controlling valve, it will be understood that the pump could be placed lower on a level with the main fuel tank and the oil ducts extended upwardly to the vaporizer nozzles, thus dispensing with the usual oil pump. It is also evident that a simple or multiple acting pump might be substituted and various other modifications made without departing from the principle of this invention, and I do not, therefore, strictly limit myself to the exact construction shown.

I claim as my invention:

1. The combination with an internal combustion motor having two explosion cylinders and pistons operative therein, of means for supplying explosive mixture to said cylinders, comprising a casing formed with two chambers and sets of passageways connected therewith, a double-acting piston in each of said chambers dividing the same into two pumping compartments operative respectively upon pure air and gas mixture, means for admitting air separately into the passageways leading to the respective compartments, a vaporizer associated with the air-inlet passageways leading to the gas compartments, and valve mechanism coöperating with said pumping pistons whereby the same operate to force pure air from one chamber and also explosive mixture from the other chamber into each of the motor cylinders.

2. The combination with an internal combustion motor having two explosion cylinders and pistons operative therein, of means for supplying explosive mixture to said cylinders, comprising a casing formed with two chambers and sets of passageways connected therewith, a double-acting piston in each of said chambers dividing the same into two pumping compartments operative respectively upon pure air and gas mixture, means for admitting air separately into the passageways leading to the respective compartments, a vaporizer associated with the air-inlet passageways leading to the gas compartments, valve mechanism coöperating with said pumping pistons whereby the same operates to force pure air from one chamber and also explosive mixture from the other chamber into each of the motor cylinders, and a governing valve for regulating the amount of explosive mixture so forced into the explosion chamber.

3. The combination with an internal combustion motor having two explosion cylinders and pistons operative therein, of means for supplying explosive mixture to said cylinders, comprising a casing formed with two chambers and sets of passageways connected therewith, a double-acting piston in each of said chambers dividing the same into two pumping compartments operative respectively upon pure air and gas mixture, means for admitting air separately into the passageways leading to the respective compartments, a vaporizer associated with the air-inlet passageways leading to the gas compartments, and valve mechanism coöperating with said pumping pistons whereby the same operate to force pure air from one chamber and also explosive mixture from the other chamber into the motor cylinder, said valve mechanism being operative to permit explosive mixture to be forced into each of the motor cylinders only during the compression stroke of the motor piston.

4. The combination with an internal combustion motor having two explosion cylinders and pistons operative therein, of means for supplying explosive mixture to said cylinders, comprising a casing formed with two chambers and sets of passageways connected therewith, a double-acting piston in each of said chambers dividing the same into two pumping compartments operative respectively upon pure air and gas mixture, means for admitting air separately into the passageways leading to the respective compartments, a vaporizer associated with the air-inlet passageways leading to the gas compartments, means for heating some of said gas mixture passageways, and valve mechanism coöperating with said pumping pistons whereby the same operate to force pure air from one chamber and also explosive mixture from the other chamber into each of the motor cylinders.

5. The combination with an internal combustion motor having a motor cylinder and a piston operative therein, of means for supplying mixture to said cylinder comprising a casing formed with a pair of cylinders, a double-acting piston in each of said last-mentioned cylinders dividing each thereof into gas and air compartments respectively, sets of passageways leading from the air-inlet openings through the respective compartments and to the motor cylinder, a vaporizer associated with the air-inlet opening and passageways leading to the gas compartments, and valve mechanism coöperating with said pumping pistons so that during a single stroke of the motor piston air is first forced from one of the pumping cylinders to the motor cylinder and thereafter explosive mixture is forced from the other pumping piston to the same motor cylinder.

6. In an internal combustion motor the combination with two motor cylinders having inwardly-disposed exhaust ports and outwardly-disposed air and gas inlet ports, all of said ports being adapted to be uncovered and closed by the motor pistons, of two pumping cylinders each having a double-acting piston working therein and dividing each pumping cylinder into pumping compartments operative respectively upon pure air and gas mixture, independent air and gas-conducting passages leading from each pumping cylinder to each motor cylinder, a valve for each motor cylinder closing the gas-inlet ports during the expansion strokes of the motor pistons and opening the said ports during the compression strokes of said pistons, elements coacting with the said air and gas passages for the induction at a single stroke of the pistons of air from one of the pumping cylinders and thereafter gas from the other pumping cylinder into one of the motor cylinders, alternating the said induction from one motor cylinder to the other during each succeeding stroke of the pumping pistons, and means for supplying gas mixture to the gas compartments of the pumping cylinders.

7. The combination with an internal combustion motor having two explosive cylinders, pistons operative therein, of means for supplying explosive mixture to said cylinders, comprising a casing formed with a pair of chambers and sets of passageways, a pumping piston having portions operative in each of said chambers for compressing air on one side of each pumping piston and fuel on the other side thereof, means for admitting air separately into the passageways leading to the respective chambers, a vaporizer associated with the air inlet passageway leading to the gas supplying chambers, and valved mechanism coöperating with said pumping pistons whereby the same operate to force pure air into one motor cylinder from one chamber and explosive mixture into the other motor cylinder from the other chamber.

8. In an internal combustion motor, the combination with two motor cylinders having inwardly disposed exhaust ports adapted to be uncovered and closed by the motor pistons during the inner portion of their strokes, of outwardly disposed air and gas inlet ports adapted to be covered by the motor pistons during the outer portion of their strokes, an induction valve for each motor cylinder adapted to hold the said inlet ports closed during the expansion strokes of the motor pistons and opening the said ports during the compression strokes of the said pistons, two pumping cylinders having double-acting pistons working therein which form a separate air and gas pumping compartment in each pumping cylinder, means for supplying air and gas independently to the said compartments, a passage leading from each air pumping compartment to the air inlet ports of each motor cylinder and a passage leading from each gas pumping compartment to the gas inlet ports of each motor cylinder, so that the coöperation of said elements results in the induction at a single stroke of the pumping pistons, of air from one of the pumping cylinders while the exhaust ports are open and thereafter gas from the other pumping cylinder after the exhaust ports are closed into one motor cylinder and then the other at each succeeding stroke of the pumping pistons.

9. The combination with an internal combustion motor having two explosive cylinders and pistons operative therein, of means for supplying air and explosive mixture to said cylinders comprising a casing formed with two chambers and sets of passageways connected thereto, a pumping piston in each of said cylinders dividing the same into air and gas pumping compartments respectively, means for admitting air separately into the passageways leading to said air compartments and gas compartments, a vaporizer associated with the air inlet passageways leading to the gas compartments, other passageways formed in said casing leading from the said compartments to the motor cylinders and connecting said gas compartments with each other, a regulating valve in said connecting passageway, and valved mechanism coöperating with said pumping piston whereby the same operate to force pure air from one chamber and also explosive mixture from the other chamber into each of the motor cylinders.

In witness whereof, I have hereunto set my hand this 5" day of March, 1914.

JAMES JESSEN.

Witnesses:
 GENEVIEVE E. SORENSEN,
 EDWARD A. PAUL.